United States Patent [19]

Tsuno

[11] Patent Number: 4,740,429
[45] Date of Patent: Apr. 26, 1988

[54] METAL-CERAMIC JOINED ARTICLES

[75] Inventor: Nobuo Tsuno, Kasugai, Japan

[73] Assignee: NGK Insulators, Ltd., Japan

[21] Appl. No.: 886,402

[22] Filed: Jul. 17, 1986

[30] Foreign Application Priority Data

Jul. 22, 1985 [JP] Japan ................................. 60-160329

[51] Int. Cl.[4] ............................................ B32B 15/04
[52] U.S. Cl. .................................. 428/627; 428/632; 428/633; 428/660; 428/662; 428/663; 428/665; 428/685
[58] Field of Search ................. 92/212, 222, 224, 231; 428/627, 632, 633, 660, 662, 663, 665, 685

[56] References Cited

U.S. PATENT DOCUMENTS

| | | | |
|---|---|---|---|
| 4,532,190 | 7/1985 | Kanbe et al. | 428/660 |
| 4,538,562 | 9/1985 | Matsui et al. | 428/633 |
| 4,559,277 | 12/1985 | Iro | 428/633 |
| 4,591,535 | 5/1986 | Mizuhara | 428/627 |
| 4,598,025 | 7/1986 | Mizuhara | 428/663 |

FOREIGN PATENT DOCUMENTS

| | | |
|---|---|---|
| 0038584 | 10/1981 | European Pat. Off. . |
| 0111989 | 6/1984 | European Pat. Off. . |
| 1029726 | 3/1958 | Fed. Rep. of Germany . |
| 1030659 | 3/1958 | Fed. Rep. of Germany . |
| 3422329 | 1/1985 | Fed. Rep. of Germany . |
| 2298609 | 1/1976 | France . |
| 811088 | 4/1959 | United Kingdom . |
| 1292982 | 10/1972 | United Kingdom ................ 428/663 |

OTHER PUBLICATIONS

Chemical Abstract, vol. 82, No. 6, 10th Feb. 1975, p. 216.

*Primary Examiner*—L. Dewayne Rutledge
*Assistant Examiner*—George Wyszomierski
*Attorney, Agent, or Firm*—Parkhurst & Oliff

[57] ABSTRACT

Metal-ceramic joined articles having a splendid joint strength can be provided easily, even when the metallic member has a largely different thermal expansion coefficient from that of the ceramic member of the metal-ceramic article.

12 Claims, 2 Drawing Sheets

METAL-CERAMIC JOINED ARTICLES

BACKGROUND OF THE INVENTION

1. Field of the Invention

The present invention relates to metal-ceramic joined articles, particularly, metal-ceramic joined articles wherein a metallic member and a ceramic member are joined together by active brazing metals, and metal-ceramic joined articles with a metallic body wherein a metallic member and a ceramic member are joined by active brazing metals and the metallic body is bonded to the metallic member.

2. Related Art Statement

Heretofore, as one method of joining ceramic members mutually or a metallic member and a ceramic member to each other, a joining method using active brazing metals has been known. In this joining method, superposed foils of alloys containing an active metal such as Ti or Zr, or a foil of such active metal superposed on a foil of metal such as Ni, are sandwiched between surfaces of ceramic members or surfaces of a metallic member and a ceramic member to be joined, and heated to effect joining of the members. For example, U.S. Pat. No. 2,857,663 and Japanese patent application publication No. 12,575/61 disclose a brazing method wherein a foil of a Ti group metal and a foil of Cu or Ni are sandwiched and heated between surfaces of a metallic member and a ceramic member or surfaces of ceramic members to be joined. However, this method has a drawback of low joint strength.

U.S. Pat. No. 4,471,026 discloses ternary alloy solders consisting of Cu, Ti and a metal selected from Ag, Au, Sn or In for brazing ceramic members. Moreover, methods of producing the brazing metals by preliminarily melting three metals to form an alloy thereof, knitting three metal wires together to form a strand, superposing three metal sheets on top of each other, or mixing three metal powders together are also disclosed. However, these methods also have the drawback of a low joint strength.

Japanese patent application laid-open No. 81,071/85 discloses a metal sheet for joining ceramic members, wherein the layer of brazing metal is coated with a layer of active metal. However, this sheet has a shortcoming that the thickness of the active metal layer is too large compared to the thickness of the brazing metal layer, so that a joint of satisfactory strength can not be obtained.

SUMMARY OF THE INVENTION

An object of the present invention is to provide a metal-ceramic jointed article which is easy to produce and has a high joint strength.

Another object of the present invention is to provide metal-ceramic jointed articles with a jointed metallic body in which the metal of the above metal-ceramic jointed articles is jointed to another metallic body.

The present metal-ceramic jointed article comprises a ceramic member, a metal member, and a joining layer containing 5-50 wt% of Ni, 30-70 wt% of Ag, 15-40 wt% of Cu and 1-10 wt% of Ti, the ceramic member and the metallic member being integrally joined together with the aid of the joining layer.

The present metal-ceramic joined article can also be joined to a metallic body and comprises a ceramic member, a metallic member, a metallic body, and a joining layer containing 5-50 wt% of Ni, 30-70 wt% of Ag, 15-40 wt% of Cu and 1-10 wt% of Ti, the ceramic member and the metallic member being integrally joined with the aid of the joining layer, and the metallic body being bonded to the metallic member with the aid of a bonding agent or brazing metal.

According to the present invention, the metallic member and the ceramic member are integrally joined through the specific joining layer, so that joined articles having a superior mechanical strength for the joint can be provided, without special treatment such as metallizing etc., of the surface of the ceramic member to be joined, as described in U.S. Pat. No. 4,538,562 to Matsui and Tsuno.

Amoung the metal elements constituting the joining layer, copper or silver gives fluidity to molten alloys composed of the metal elements constituting the joining layer, as well as tenacity and strength to the joining layer after solidification. Nickel is for improving heat resistivity of the joining layer. Titanium is for chemically combining the ceramic member and the joining layer, and for improving heat resistivity and mechanical strength of the joining layer.

Regarding the metal elements constituting the joining layer, the content of copper is preferably 15-40 wt% and particularly 20-30 wt%. If the copper content is less than 15 wt% or above 40 wt%, fluidity of the molten alloy composed of the metal elements constituting the joining layer is decreased, the molten alloy has difficulty flowing into the interstices formed between the ceramic member and the metallic member, and the mechanical strength of the joining layer is decreased.

The content of silver is preferably 30-70 wt%, and particularly 44-59 wt%. If the silver content is less than 30 wt% or above 70 wt%, fluidity of the molten alloy is decreased, and the mechanical strength of the joining layer is decreased.

The content of nickel is preferably 5-50 wt%, and particularly 10-30 wt%. If the nickel content is less than 5 wt%, there can be seen no remarkable improvement of heat resistivity of the joining layer. If the nickel content is above 50 wt%, fluidity of the molten alloy is decreased extremely.

The content of titanium is preferably 1-10 wt%, particularly 2.5-7.5 wt%. If the titanium content is less than 1 wt% or above 10 wt%, strength of the joining layer is decreased extremely.

The jointed articles of the present invention are produced by infiltrating the molten metals of a specific composition between the surfaces of the ceramic member and the metallic member to cause reactions between the molten metals and the ceramic member and between the molten metals and the metallic member, and thereafter solidifying the molten alloy. In this case, the composition of the molten metals before infiltration may be the same as or different from the composition of the joining layer. In either case, it is only necessary that the molten metals complete reactions with the ceramic member or the metallic member and become, after being solidified, the composition of the joining layer of the present invention. Alternatively, the molten metals after being solidified may be subjected to an appropriate diffusion heat treatment to obtain the composition of the jointing layer of the present invention.

For ascertaining whether the composition of the joining layer is within the range of the present invention, electron probe micro analysis (EPMA, XMA), energy dispersive X-ray spectroscopy (EDX) or other analytical methods can be readily employed.

Another method of obtaining the joined articles of the present invention is, for example, a method wherein metals of a specific composition are disposed, melted and solidified between the surfaces of the metallic member and the ceramic member to be joined thereby reacting with the molten metals in the ceramic member and the metallic member. In this case also, the composition of the metals disposed between the surfaces of the metallic member and the ceramic member to be joined may be the same as or different from the composition of the jointing layer. In either case, it is only necessary that the molten metals complete reactions with the ceramic member or the metallic member and become, after being solidified, the composition of the joining layer of the present invention.

When using the reaction of the molten metals with the ceramic member or the metallic member to produce the joining layer of the composition of the present invention, necessary metal element or elements may preferably be applied in advance on the surface of the metallic or ceramic member by vapor deposition or plating, etc.

If diffusion heat treatment is used to change the composition of the joining layer to the composition of the joining layer of the present invention, the metallic member may be made of an alloy comprising the metal element to be diffused into the joining layer.

The metallic member and the ceramic member constituting the joined articles of the present invention may be selected based on their raw materials depending on the intended use for the joined articles. Fundamentally, they are preferably selected in such combinations that a difference between their thermal expansion coefficients is as small as possible.

Illustrative examples of such combinations are as follows. For instance, if a ceramic member is made of a ceramic material comprising silicon nitride, silicon carbide and sialon, and the ceramic member is to be jointed with a metallic member, the metallic member is preferably constituted from at least one metal material selected from the group consisting of Fe-Ni alloys, Fe-Ni-Co alloys, Ta, Ta alloys, W, W alloys, Mo, Mo alloys, Nb and Nb alloys.

If a ceramic member made of at least one ceramic material selected from the group consisting of zirconia, alumina, mullite, aluminum titanate and cordierite is to be joined with a metallic member, the metallic member is preferably at least one metal material selected from the group consisting of Fe-Ni alloys, Fe-Ni-Co alloys, Ta, Ta alloys, W, W alloys, Mo, Mo alloys, Nb, Nb alloys, Ti, Ti alloys and ferritic stainless steels.

In the above mentioned metal materials, there are included Fe-Ni alloys such as 42 alloy and 52 alloy composed of Fe and Ni, and low expansion alloys such as Invar containing a small amount of another element. Similarly, in the Fe-Ni-Co alloys, there are included Kovar and Super Invar composed of Fe, Ni and Co, and low expansion alloys such as Incoloy 903 containing a small amount of another element.

When combining a metallic member and a ceramic member having a large difference between thermal expansion coefficients, the above mentioned metal materials of low expansion property may be disposed between the both members as a stress buffer.

In an embodiment of the present invention, the metal-ceramic joined articles of the present invention may be integrally bonded to another metallic body by using a part of the metallic member. In this case, the bonding of the metallic member and the metallic body can be effected by the methods of brazing, diffusion bonding, welding, bolting, interface fitting and insert casting. In this case, thermal stresses generated between the ceramic member and the metallic body due to a difference between their thermal expansion coefficients is absorbed or buffered by the metallic member intervening therebetween.

The thickness of the metallic member for functioning as a stress buffer is determined depending on shapes of the metallic body and the ceramic member, the extent of the difference between their thermal expansion coefficients and the surface area to be bonded, and a minimum thickness is necessary for functioning as a stress buffer.

Brazing of the metallic member and the metallic body may be effected separately or simultaneously with the joining of the ceramic member and the metallic member together.

Other objects and advantages of the present invention will be apparent from the ensuing descriptions and claims.

BRIEF DESCRIPTION OF THE DRAWINGS

For a better understanding of the present invention, reference is made to the accompanying drawings, in which.

Figure 1:
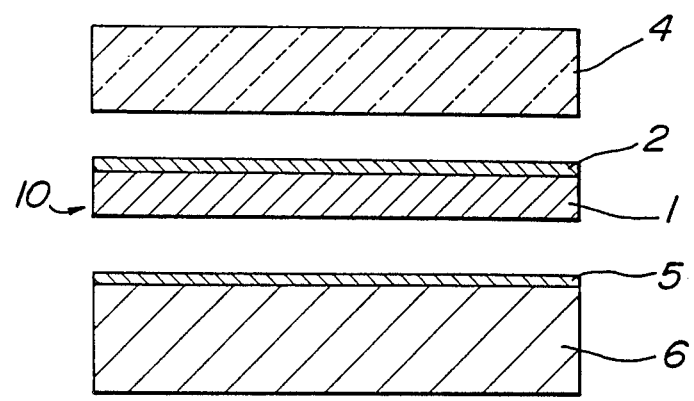
FIG. 1 is a schematic view of a cross section of the metal-ceramic joined article of the present invention in an exploded view illustrating a method of joining a metallic member and a ceramic member.

Throughout different views of the drawings, the reference numerals indicate the following:

1 ... Ag-Cu alloy plate, 2 ... titanium layer, 4 ... ceramic member, 5 ... nickel plating, 6 ... metallic member, 8 ... metallic body, 10 ... active brazing metals, 11 ... ceramic disc, 12 ... metallic member A, 13 ... metallic body B, 22 ... journal shaft, 23 ... recess, 24 ... ceramic shaft, 25 ... turbine blades wheel.

DETAILED DESCRIPTION OF THE PREFERRED EMBODIMENT

Hereinafter, the present invention will be explained in more detail with reference to the attached drawings.

EXAMPLE 1

Referring to FIG. 1 which shows an illustrative method of producing the metal-ceramic joined article of the present invention, a ceramic member 4, a metallic member 6 to be joined therewith, and an active brazing metal 10, are at first prepared. The active brazing metal 10 is preferably composed of an Ag-Cu alloy 1 and a thin metal titanium layer 2 is applied on the surface of the Ag-cu alloy 1, because it is easy to produce and control its composition.

Both the ceramic member 4 and the metallic member 6 are purified at their surfaces which are to be joining. The purified surface of the metallic member 6 is covered with a nickel plating 5. The active brazing metal 10 is disposed between the joining surfaces of the ceramic member 4 and the metallic member 6, and both members 4 and 6 are aligned in a joining position and are fixed together by an appropriate fixing means. Thereafter, they are heated in a furnace in vacuo at a temperature of at least the melting point of the Ag-Cu alloy 1 and below melting points of the ceramic members 4 and the metallic member 6, to melt the active brazing metal 10.

The heating at temperature is held for an appropriate time to react the molten active brazing metal 10 with the ceramic member 4 and the nickel plating layer 5 on the metallic member 6. Then, the furnace temperature is lowered to solidify the brazing metal thereby to complete the joining. The temperature holding time is determined by a time necessary for alloying the nickel plating layer 5, the Ag-Cu alloy 1 and the metal titanium layer 2 constituting the brazing metal 10, and for the reaction of the brazing metal 10 with the ceramic member 4 and the metallic member 6.

EXAMPLE 2

Figure 2:
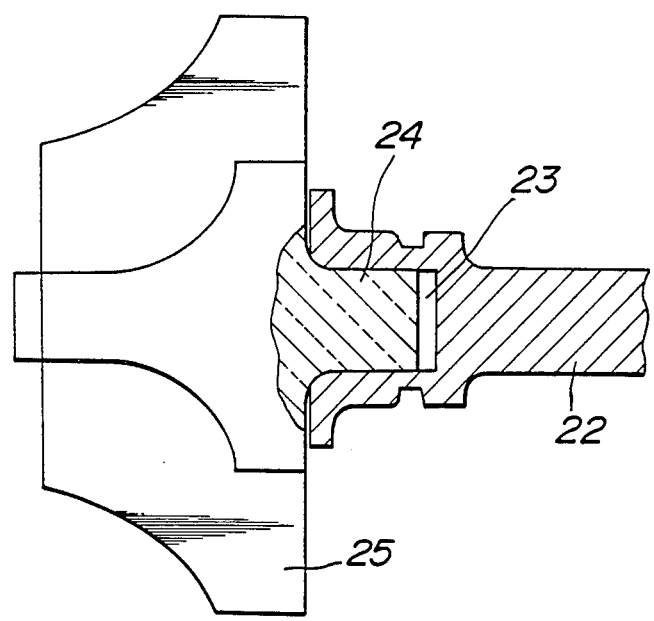
FIG. 2 is a cross section of a turbocharger rotor which is an embodiment of the metal-ceramic joined article of the present invention wherein a metallic member and a ceramic member are joined integrally together via the joining layer.

Referring to FIG. 2 which shows a schematic cross section of a turbocharger rotor which is an embodiment of the metal-ceramic jointed article of the present invention, the turbocharger rotor is produced by joining an outer surface of a ceramic shaft 24 arranged at a central portion of a ceramic turbine blades wheel 25 and an inner surface of a recess 23 arranged in a metallic journal shaft 22 with the aid of the joining layer of the present invention.

The joining is effected, for example, as follows. The ceramic turbine blade wheel 25 having the ceramic shaft 24 is prepared. Next, the metallic journal shaft 22 having the recess 23 at one end is prepared, and nickel plating is effected on the inner surface of the recess 23. Thereafter, the active brazing metal consisting of an Ag-Cu alloy coated with titanium is positioned in the bottom of the recess 23, and the ceramic shaft 24 of the turbine blade wheel 25 is inserted in the recess 23 of the ceramic shaft 24. The thus obtained assembly is put into a furnace, and heated in vacuo to melt the active brazing metal and to penetrate the molten active brazing metal to the mating surface between the circumferential outer surface of ceramic shaft 24 and the inner surface of recess 23 by capillary action, thereby reacting the molten metals with the nickel plating and the ceramic of the ceramic shaft 24 to obtain the joining layer of the composition of the present invention, and is then cooled to integrally join the ceramic shaft 24 and the metallic journal shaft 22 together.

EXAMPLE 3

Figure 3:
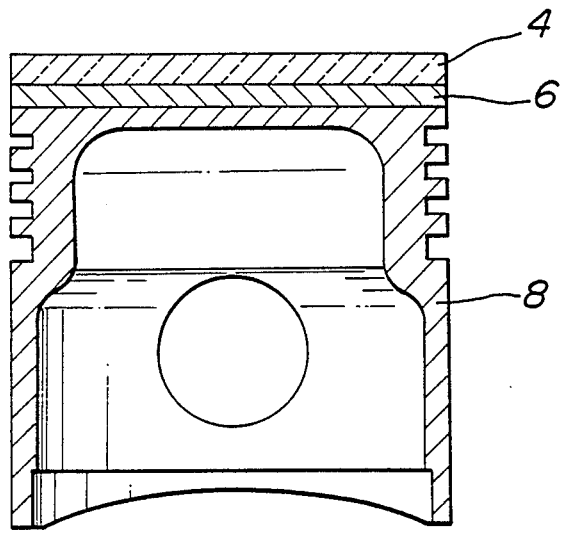
FIG. 3 is a cross section of a piston of an internal combustion engine, which is an embodiment of the metal-ceramic joined article with a joined metallic body of the present invention, wherein the metal-ceramic joined article is joined integrally with the metallic body by using the metallic member thereof.

Referring to FIG. 3 which shows a schematic cross section of a piston of an internal combustion engine, this is an embodiment of the metal-ceramic joined article having a joined metallic body of the present invention, wherein the metal-ceramic joined article is joined integrally with the metallic body by using the metallic member thereof.

The piston can be produced as follows. At first, a disc-shaped ceramic member 4 and a disc-shaped metallic member 6 are prepared and are used to produce a disc-shaped metal-ceramic jointed article wherein the ceramic member 4 is integrally joined with the metallic member 6 by the joining layer of the composition of the present invention. Then, the disc-shaped metallic member 6 of the metal-ceramic joined article is integrally joined with the piston 8 by means of a commercial brazing metal. In this case, the surfaces of the metallic member 6 and the metallic body or piston 8 may be preliminarily provided with a metal plating, in order to improve their wettability to the molten brazing metal.

EXAMPLE 4

Figure 4:
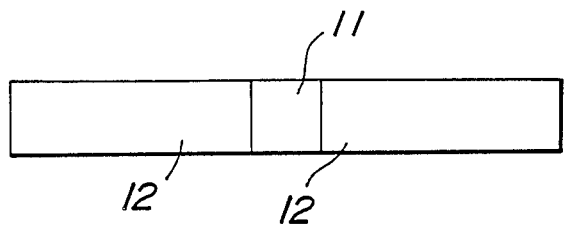
FIG. 4 is a schematic cross section illustrating a structure of a test piece for measuring joint strength of the metal-ceramic joined article of the present invention.

A brazing metal produced by applying titanium on a surface of a silver-copper alloy by a sputtering process is used to join both surfaces of ceramic discs of a diameter of 11 mm and a height of 10 mm made of various ceramic materials described in the following Table 1 with rods 12 of various metals also described in the following Table 1 at various temperatures of 830°–900° C., to produce metal-ceramic joined articles of a total length of 100 mm and a shape as shown in the attached FIG. 4, wherein the ceramic disc 11 is joined at both of its surfaces with the metal rods 12 which correspond to a metallic member A. An outer periphery of the joined articles is finished to a diameter of 10 mm by machining. Then, the articles are measured joining strength of the joined by a tensile test machine. The results are shown in the following Table 1. Breakage or fracture of test pieces or specimens in the tensile strength tests occur on either one of the two joints existing in the joined articles. Therefore, respective test pieces, after being subjected to the tensile test are severed in longitudinal direction, and non-broken or non-fractured joints are analyzed on their compositions by means of the aforedescribed EDX method. The results are shown in the following Table 1.

For comparison purposes, test pieces beyond the numeral ranges of the present invention are produced and tested. They are also described in Table 1 as referential specimen Nos. 21–23.

TABLE 1

| Specimen No. | Composition of the joining layer (wt %) | | | | Combination of joined articles | | Joint strength (kg/mm$^2$) |
| --- | --- | --- | --- | --- | --- | --- | --- |
| | Ni | Ag | Cu | Ti | Ceramics | Metal | |
| 1 | 7 | 60 | 30 | 3 | silicon nitride | Kovar | 18 |
| 2 | 12 | 58 | 25 | 5 | silicon nitride | Kovar | 19 |
| 3 | 25 | 45 | 25 | 5 | silicon nitride | Kovar | 19 |
| 4 | 7 | 60 | 25 | 8 | silicone nitride | Kovar | 20 |
| 5 | 12 | 58 | 25 | 5 | silicon nitride | Mo | 23 |
| 6 | 12 | 58 | 25 | 5 | alumina | Kovar | 16 |
| 21 | 0 | 72.5 | 27 | 0.5 | silicon nitride | Kovar | 4 |
| 22 | 4 | 72 | 23.5 | 0.5 | silicon nitride | Kovar | 5 |
| 23 | 4 | 71 | 14 | 11 | silicon nitride | Kovar | 3 |

As seen from the results of the specimen Nos. 1–6, the joined articles joined by the joining layer of the composition of the present invention exhibit high joint strengths. While, the specimen Nos. 21-23 joined by joining layers of compositions which are beyond the limits of the present invention exhibit low joint strengths.

EXAMPLE 5

Ceramic discs 11 of a diameter of 11 mm and a height of 10 mm made of the ceramics described in the following Table 2 were produced, and metal discs 12 corresponding to the metallic member A to be joined were produced from the materials described in Table 2 and had a diameter of 11 mm and thicknesses as described in Table 2. Nickel plating was applied on both surfaces of the metal discs 12 with a thickness of 10 μm. Active brazing metals were produced by applying titanium of a thickness of 2 μm on a surface of an alloy plate of a thickness of 0.1 mm consisting of 72 wt% of Ag and 28 wt% of Cu by means of sputtering.

Figure 5:
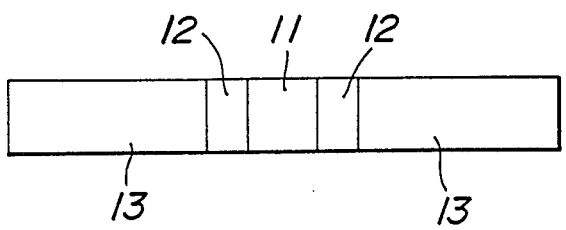
FIG. 5 is a schematic cross section illustrating a structure of a test piece for measuring joint strength of the metal-ceramic joined article with a joined metallic body.

The brazing metal was disposed between a surface of the ceramic disc 11 and a surface of the metal disc 12, and was heated to 850° C. for a desired time to melt the brazing metal to react the molten brazing metal with the nickel plating and the ceramic disc 11. This procedure formed a joining layer which had the same composition as the composition of specimen No. 2 of the above Table 1, which joined the ceramic disc 11 and the metal disc 12. At the same time, on the remaining surface of the metal disc 11, a metal rod 13 corresponding to a metallic body B of a diameter of 11 mm and made of spherical graphite cast iron (to be referred to as "FCD" hereinafter) as described in the following Table 2 was joined by means of a commercial silver solder to obtain a metal-ceramic joined article of a total length of about 100 mm, wherein the ceramic disc 11, the metal disc 12 and the metal rod 13 were integrally jointed in a shape as shown in the attached FIG. 5. The outer periphery of the metal-ceramic joined articles were finished to a diameter of 10 mm by machining, and the joint strength was measured by a tensile test machine. The results are shown in the following Table 2.

For comparison purposes, a metal-ceramic joined article, wherein the combination of the ceramic member and the metallic member is beyond the combinations of the present invention, was produced as referential specimen No. 24, and metal-ceramic joined articles wherein the metal disc 12 corresponding to the metallic member A is too thin to function as a stress buffer were also produced as referential specimen Nos. 25 and 26, and their joint strengths were measured. The results are shown in Table 2.

TABLE 2

| Specimen No. | Ceramics | Joined metallic member A Name | Thickness (mm) | Joined metallic body B | Joint strength (kg/mm$^2$) |
| --- | --- | --- | --- | --- | --- |
| 7 | silicon nitride | Kovar | 3 | FCD | 7 |
| 8 | silicon nitride | Kovar | 5 | FCD | 14 |
| 9 | silicon nitride | Kovar | 10 | FCD | 18 |
| 10 | silicon nitride | Kovar | 30 | FCD | 18 |
| 11 | silicon nitride | Mo | 3 | FCD | 20 |
| 12 | silicon nitride | Kovar | 3 | FCD | 10 |
| 13 | alumina | Fe—42Ni | 3 | FCD | 10 |
| 14 | alumina | Mo | 3 | FCD | 12 |
| 15 | alumina | Ti | 3 | FCD | 10 |

TABLE 2-continued

| Specimen No. | Ceramics | Joined metallic member A Name | Thickness (mm) | Joined metallic body B | Joint strength (kg/mm$^2$) |
| --- | --- | --- | --- | --- | --- |
| 24 | silicon nitride | Ti | 5 | FCD | —* |
| 25 | silicon nitride | Kovar | 2 | FCD | 2 |
| 26 | alumina | Kovar | 2 | FCD | 3 |

Note:
*means an occurrence of crack in silicon nitride

As seen from the results of specimen Nos. 7-15 of the embodiments of the present invention, the metal-ceramic joined articles wherein the ceramic disc 11 is joined with the metal disc 12 via the joining layer of the composition of the present invention and the metal disc 12 is joined with the metallic body 13 by a commercial silver solder exhibited a large joint strength. While, the metal-ceramic joined article of referential specimen No. 24, which has a ceramic member and metallic member combination beyond the combinations of the present invention, fractured at the ceramic member, when cooling down from the temperature used for the joining of the metallic member and the ceramic member. The metal-ceramic joined articles of referential specimen Nos. 25 and 26, wherein the joined metallic member A is too thin to function as a stress buffer, exhibited low joint strengths.

EXAMPLE 6

A silicon nitride disc 4 of a diameter of 70 mm and a thickness of 10 mm, a Kovar alloy disc 6 of a diameter of 70 mm and a thickness of 5 mm, and a metallic body 8 made of FCD, were prepared. Both surfaces of the Kovar disc 6 and the upper end surface of the metallic body 8 were applied with Ni plating of a thickness of about 10 μm. Thereafter, the metallic body 8, a commercial silver solder of JIS BAg8, a metallic disc 6, the active brazing metal, and the ceramic disc 4, were superposed in this order from the bottom, and heated in a furnace in vacuo to join with each other to produce a piston of a shape as shown in the attached FIG. 3. The piston showed no cracks on the ceramic disc 4, even when cooled from the temperature used for joining. The piston showed no extraordinary trouble, even when used in a continuous operation of 100 hrs. in a cylinder of a diameter of 70 mm of a Diesel engine at a stroke length of 75 mm and a revolution rate of 2,200 rpm.

As apparent from the foregoing descriptions, the metal-ceramic joined articles of the present invention have many advantages such as easy production, splendid joint strength as compared with conventional metal-ceramic joined jointed articles, and relatively inexpensive metal-ceramic joined articles, wherein the metallic member can be used to easily join the ceramic member and a metallic body together, even when the metallic article has a different thermal expansion coefficient from that of the ceramic member.

Therefore, the metal-ceramic joined articles and the metal-ceramic joined articles having a joined metallic body can utilize advantageously heat resistivity, heat insulation, anti-corrosion, wear resistance and other desirable properties of ceramics, so that they are remarkably useful as parts of internal combustion engines such as pistons, tappets, intake and exhaust valves, turbochargers, rocker arms, cams and other parts which repeatedly receive high temperature exposure, high loads and high impact loads. Moreover, they are eminently useful industrially as parts of jet engines, parts of gas turbines, and parts of chemical engineering devices.

Though the present invention has been described by using specific examples, it is of course apparent to those skilled in the art that various changes and modifications thereof are possible without departing from the broad spirit and scope of the present invention as hereinafter claimed.

What is claimed is:

1. A metal-ceramic joined article comprising, a ceramic member, a metallic member, and a joint layer, said joint layer consisting essentially of 5–50 wt% of nickel, 30–70 wt% of silver, 15–40 wt% of copper and 1–10 wt% of titanium, the ceramic member and the metallic member being integrally joined by the joint layer.

2. A metal-ceramic joined article as defined in claim 1, wherein the ceramic member comprises at least one ceramic material selected from the group of materials consisting of silicon nitride, silicon carbide and sialon, and the metallic member comprises at least one metal selected from the group of metals consisting of Fe-Ni alloys, Fe-Ni-Co alloys, Ta, Ta alloys, W, W alloys, Mo, Mo alloys, Nb and Nb alloys.

3. A metal-ceramic joined article as defined in claim 1, wherein the ceramic member comprises at least one ceramic material selected from the group of materials consisting of zirconia, alumina, mullite, aluminum titanate and cordierite, and the metallic member comprises at least one metal selected from the group of metals consisting of Fe-Ni alloys, Fe-Ni-Co alloys, Ta, Ta alloys, W, W alloys, Mo, Mo alloys, Ti, Ti alloys, Nb, Nb alloys and ferritic stainless steels.

4. A metal-ceramic joined article with a bonded metallic body, comprising, a ceramic member, a metallic member, a metallic body, and a joint layer, said joint layer consisting essentially of 5–50 wt% of nickel, 30–70 wt% of silver, 15–40 wt% of copper and 1–10 wt% of titanium, the ceramic member and the metallic member being integrally joined by the joint layer, and the metallic body being bonded to the metallic member by a bonding agent.

5. A metal-ceramic joined article as defined in claim 2, wherein the ceramic member comprises at least one ceramic material selected from the group of materials consisting of silicon nitride, silicon carbide and sialon, and the metallic member comprises at least one metal selected from the group of metals consisting of Fe-Ni alloys, Fe-Ni-Co alloys, Ta, Ta alloys, W, W alloys, Mo, Mo alloys, Nb and Nb alloys.

6. A metal-ceramic joined article as defined in claim 2, wherein the ceramic member comprises at least one ceramic material selected from the group of materials consisting of zirconia, alumina, mullite, aluminum titanate and cordierite, and the metallic member comprises at least one metal selected from the group of metals consisting of Fe-Ni alloys, Fe-Ni-Co alloys, Ta, Ta alloys, W, W alloys, Mo, Mo alloys, Ti, Ti alloys, Nb, Nb alloys and ferritic stainless steels.

7. A metal-ceramic joined article formed by supplying a joint layer between a ceramic member and a metallic member, said joint layer comprising a molten alloy consisting essentially of 5–50 wt% of nickel, 30–70 wt% of silver, 15–40 wt% of copper and 1–10 wt% of titanium, thereby causing a reaction between the molten alloy and the ceramic member and causing a reaction between the molten alloy and the metallic member, whereby said members are integrally joined upon cooling and solidification of said molten alloy.

8. A metal-ceramic joined article as defined in claim 7, wherein the ceramic member comprises at least one ceramic material selected from the group of materials consisting of silicon nitride, silicon carbide and sialon, and the metallic member comprises at least one metal selected from the group of metals consisting of Fe-Ni alloys, Fe-Ni-Co alloys, Ta, Ta alloys, W, W alloys, Mo, Mo alloys, Nb and Nb alloys.

9. A metal-ceramic joined article as defined in claim 7, wherein the ceramic member comprises at least one ceramic material selected from the group of materials consisting of zirconia, alumina, mullite, aluminum titanate and cordierite, and the metallic member comprises at least one metal selected from the group of metals consisting of Fe-Ni alloys, Fe-Ni-Co alloys, Ta, Ta alloys, W, W alloys, Mo, Mo alloys, Ti, Ti alloys, Nb, Nb alloys and ferritic stainless steels.

10. A ceramic-metal joined article formed by (a) disposing an alloy between a ceramic member and a metallic member, said alloy having a composition consisting essentially of 5–50 wt% of nickel, 30–70 wt% of silver, 15–40 wt% of copper and 1–10 wt% of titanium, and (b) melting said alloy, thereby causing a reaction between said ceramic member and said alloy and a reaction between said metallic member and said alloy, whereby said members are integrally joined upon cooling and solidification of said alloy.

11. A metal-ceramic joined article as defined in claim 10, wherein the ceramic member comprises at least one ceramic material selected from the group of materials consisting of silicon nitride, silicon carbide and sialon, and the metallic member comprises at least one metal selected from the group of metals consisting of Fe-Ni alloys, Fe-Ni-Co alloys, Ta, Ta alloys, W, W alloys, Mo, Mo alloys, Nb and Nb alloys.

12. A metal-ceramic joined article as defined in claim 10, wherein the ceramic member comprises at least one ceramic material selected from the group of materials consisting of zirconia, alumina, mullite, aluminum titanate and cordierite, and the metallic member comprises at least one metal selected from the group of metals consisting of Fe-Ni alloys, Fe-Ni-Co alloys, Ta, Ta alloys, W, W alloys, Mo, Mo alloys, Ti, Ti alloys, Nb, Nb alloys and ferritic stainless steels.

* * * * *